May 13, 1924.                    1,494,169
C. W. JOHNSON
COMBINED BEARING AND PACKING MECHANISM
Filed June 19, 1920
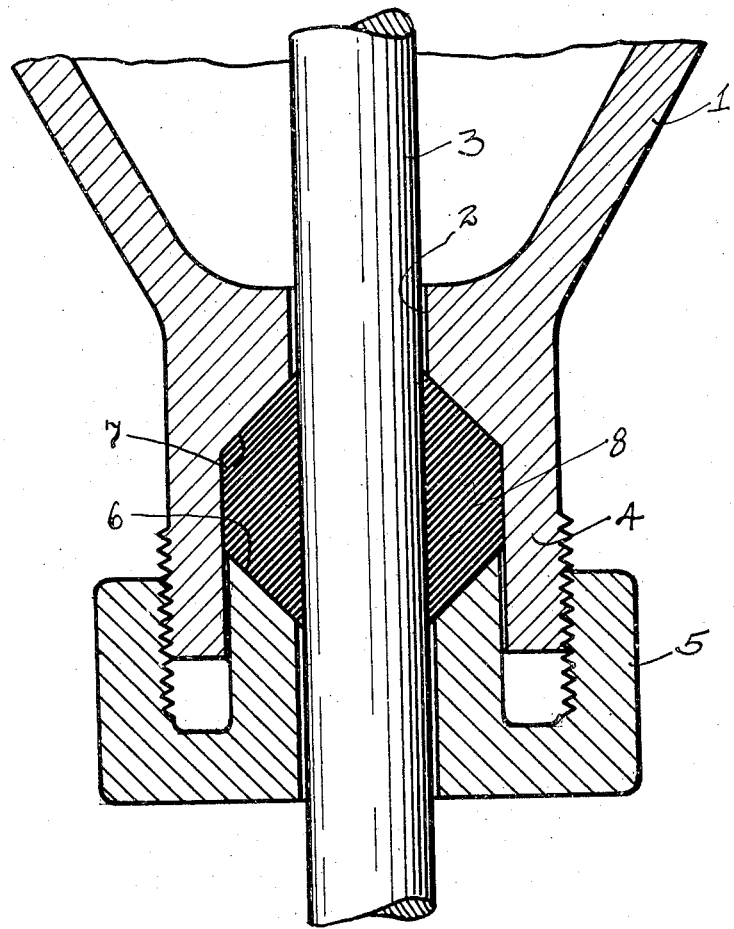
Inventor
Carl W. Johnson
By Ray, Oberlin & Ray
Attorneys Patented May 13, 1924.

1,494,169

UNITED STATES PATENT OFFICE.

CARL W. JOHNSON, OF CLEVELAND, OHIO, ASSIGNOR TO THE CLEVELAND GRAPHITE BRONZE COMPANY, OF CLEVELAND, OHIO, A CORPORATION OF OHIO.

COMBINED BEARING AND PACKING MECHANISM.

Application filed June 19, 1920. Serial No. 390,195.

*To all whom it may concern:*

Be it known that I, CARL W. JOHNSON, a citizen of the United States, and a resident of Cleveland, county of Cuyahoga and State of Ohio, have invented a new and useful Improvement in Combined Bearing and Packing Mechanism, of which the following is a specification, the principle of the invention being herein explained and the best mode in which I have contemplated applying that principle, so as to distinguish it from other inventions.

The present invention, relating, as indicated, to a combined bearing and packing mechanism, is directed to an improved mechanism, which may be used for both journaling and sealing moving elements, such as shafts and the like. In an ordinary rotary pump, for example, the shaft extending from the pump case may be both supported in a hub and also provided with means for packing it to prevent the escape of the fluid which is being acted upon by the pump member. These packings have to be renewed at frequent intervals and is quite often the source of loss of fluid pressure unless kept extremely tight.

The present invention has as its principal object the provision of a mechanism which will both journal an extending moving member from a pump, engine, or the like, and at the same time serve as a packing means to prevent the escape of fluid pressure along the shaft or other moving member. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

The single figure there appearing is a longitudinal section showing the application of my improved mechanism to a rotating shaft member extending from a casing.

In the figure I have shown a portion of a casing 1 provided with an aperture 2, through which there extends a shaft 3, and it will be understood that this may be either a rotatable or oscillatory shaft or a reciprocating member, depending upon the mechanism of which my invention is applied. The opening 2 is formed with a slight clearance about the shaft 3, the clearance being just sufficient to prevent the shaft from being journaled in the casing. I have shown the casing as being provided with an extending flange 4, which is externally threaded, and which is concentrically mounted with respect to the shaft 3. About the threaded portion of the extension 4 there may be engaged a movable member 5, also fitted over the shaft 3, which may either extend through this member or be received in suitable recesses in the inner wall of the member if the latter is imperforate. The member 5 and the extending portion of the casing 1 are provided with oppositely beveled walls 6 and 7, and between these walls and the shaft 3 there is packed a quantity or compressible bearing and packing material 8. After this material has been packed into this space, the member 5 may be adjusted along the extension of the casing 1 to force the bearing material snugly against the shaft, and this adjustment may be repeated at suitable intervals as this material wears away in order to provide a continuous bearing and packing material to support the shaft 3. It is immaterial of course whether the member 5 is formed in a single piece or in two or more pieces so long as this member and the casing are relatively movable to compress the bearing material and force the same snugly against and around the shaft which is to be journaled and packed.

The combined bearing and packing composition which I use consists of lead, Babbitt metal or some similar bearing material intimately mixed and combined with a small amount of graphite or analogous lubricant, the preferred proportions being about 95 parts of the lead or Babbitt to about five parts of graphite. Such a bearing composition is known and has previously been used in the formation of bushings. It is compressible to a sufficient extent to allow it to flow under adjustment toward each other of two parts such as the members 4 and 5 in the above mechanism, and can then be forced tightly around the shaft in the manner described. This bearing material has sufficient strength and hardness to adequately support and journal a shaft, and at the same time is sufficiently fluid and compressible to serve as a packing material about a shaft and prevent the escape of fluid pressure between the shaft and bearing.

Other modes of applying the principle of my invention may be employed instead of the one explained, change being made as regards the mechanism herein disclosed, provided the means stated by any of the following claim or the equivalent of such stated means be employed.

I therefore particularly point out and distinctly claim as my invention:—

In mechanism of the character described, the combination of a casing having an opening, a shaft extending through such opening, a rotatable adjusting member engaged with said casing about such shaft, and a compressible plastic combination bearing and packing consisting of a mixture of lead and graphite, said bearing being disposed about said shaft and filling the space between said casing and adjusting member.

Signed by me this 14th day of June, 1920.

CARL W. JOHNSON